July 2, 1940.  A. L. TAYLOR  2,206,471
SAFETY DEVICE
Filed Aug. 8, 1938
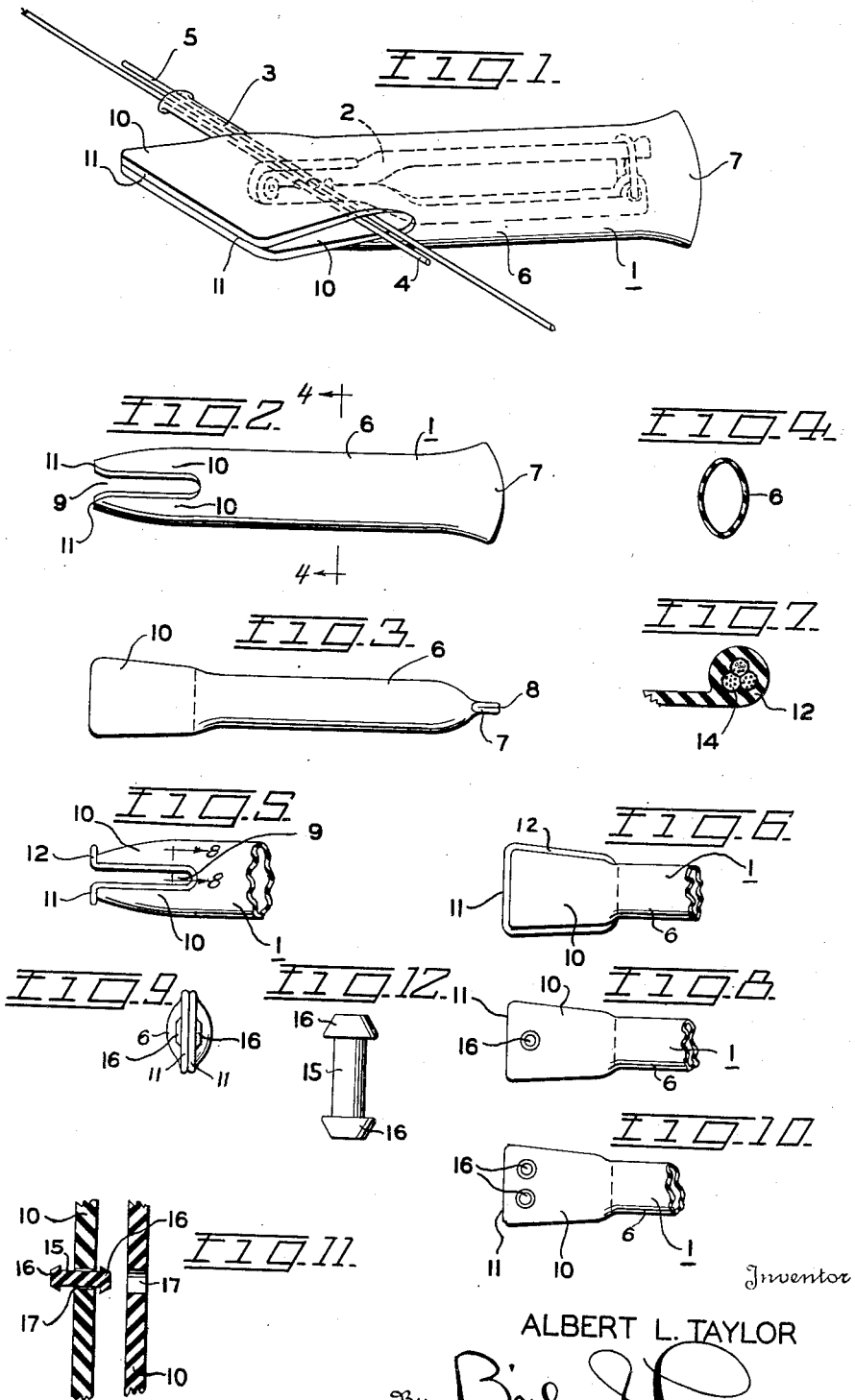
Inventor
ALBERT L. TAYLOR
By Bailey & Carson
Attorneys Patented July 2, 1940

2,206,471

UNITED STATES PATENT OFFICE 2,206,471

SAFETY DEVICE

Albert L. Taylor, Miami, Fla.

Application August 8, 1938, Serial No. 223,733

9 Claims. (Cl. 174—5)

This invention relates to a safety device, and in particular to such a device which is particularly adapted for the protection of linesmen engaged in connecting the ends of electric wires, conduits, or cables.

It is an object of this invention to provide such a device which will afford to the worker or linesman the maximum achievable safety and convenience, in use, and which is of simple and inexpensive construction though possessed of a high degree of strength and durability.

It is a further object of this invention to provide such a device which is possessed of sufficient insulating capacity to permit of its use by a linesman working with wires or cables of a high voltage electric distribution system.

It is a further object of this invention to provide such a device in the form of a flexible and/or resilient sleeve or boot adapted to be telescopically placed over a connector tool when clamped to a connector sleeve and conductor ends in such manner that the sleeve and conductor ends may extend outwardly from each side thereof.

It is a further object of this invention to provide such a device which may be permanently secured in position for enclosing the connector tool and a portion of the conductor ends either through the resiliency of the material from which it is constructed or by snap fastening means secured through apertures provided in the body thereof.

These and other objects and advantages will appear from the following description taken in connection with the drawing.

In the drawing:

Fig. 1 is a view, in perspective, of the connector sleeve or boot in operative position with the connector tool enclosed thereby, as indicated by dash lines;

Fig. 2 is a side elevation of the safety device illustrated in Fig. 1;

Fig. 3 is a top plan view of the device illustrated in Fig. 1;

Fig. 4 is a section taken on the line 4—4 of Fig. 2;

Fig. 5 is a fragmentary side elevation, similar to Fig. 2, of a modified form of the safety device;

Fig. 6 is a plan view of the structure as shown in Fig. 5;

Fig. 7 is an enlarged fragmentary view, in section, illustrating the reenforcement of the modified safety device illustrated in Figs. 5 and 6;

Fig. 8 is a fragmentary plan view of a second modified form of the safety device, embodying single snap fastener means;

Fig. 9 is an end view of the structure shown in Fig. 8;

Fig. 10 is a view similar to Fig. 8 but showing a third modified form of the device embodying a plurality of snap fastener devices; and Fig. 11 is an enlarged fragmentary view in section taken on the line 11—11 of Fig. 8 and illustrating the snap fastener means and the manner in which it is secured in the device; and Fig. 12 is a view in elevation of a resilient member constituting the preferred form of snap fastener means shown in section in Fig. 11.

Formerly, linesmen have been subjected to certain hazards arising because of clothing so dampened from perspiration as to provide a good electrical contact or connector. In such cases, when a linesman, in making joints in the conductors of an electric distribution system, had the cuff of his rubber glove subjected to contact with the connector tool or a conductor, serious electric burns and, in some cases, fatal shocks occurred. According to the principles of this invention, such accidents are eliminated by fully enclosing the connector tool within a safety device of boot or sleeve form, which device is constructed of non-conducting or insulating material, whereby fully to guard the linesman against such damage.

Referring to the drawing in detail, and with reference particularly to Figs. 1, 2, 3 and 4, it will be seen that the device, which is generally designated 1, is adapted to provide full coverage of the connector tool 2 when clamped in place over the connector sleeve 3 through which the conductor ends or wire ends 4 and 5 are inserted. The central portion 6 of the device is of substantially elliptical section as shown in Fig. 4. One end 7 thereof is substantially flat and the ends of the walls are secured by molding or vulcanization at 8 as shown in Fig. 3. The opposite end is provided with a longitudinal slot 9 of sufficient width to permit the conductor ends 4 and 5 and the sleeve 3 to extend therethrough between the lips or edges 10 thereof. The end edges 11 will, of course, be maintained in close engagement because of the resiliency of the material from which the body 1 is formed.

If it is desired to accentuate the close engagement of the end edges 11, the rigidity of the socket end portion may be increased as shown in Figs. 5 to 7 by the provision of the bead member 12 of substantial thickness and preferably of arcuate shape as shown particularly in Fig. 7. This bead 12 is preferably provided with interior reenforcement in the form of a cord or cable 14 of textile, metal or other material.

If it is desired that the end edges 11 be positively secured together, this may be achieved by the provision of snap fastener means either of the single form, as illustrated in Figs. 8 and 9 or of double form as illustrated in Fig. 10. The details of the snap fastener means are illustrated in Fig. 11, wherein it will be seen that these means comprise substantially frusto-conical bead members or buttons 16 connected by the substantially cylindrical body portion 15, all of which are formed of rubber or like material. As will be understood from Fig. 11 the bead members or buttons 16 may be thrust through apertures 17 provided in the lips 10 to secure the lips 10 removably together. It is to be noted that no metallic parts are included in the body material and that the provision of these non-metallic snap fastener members in no wise decreases the insulating capacity of the body 1 thereof.

The body 1 is preferably formed of rubber, synthetic rubber, or rubber equivalent suitably molded or otherwise formed into the desired shape and vulcanized. Where it is further desirable to decrease the resiliency of the body and impart additional rigidity thereto, then it is contemplated that textile reenforcement either woven or otherwise, such as fabric or cord, may be embedded therein as is well-known in the rubber art.

It is, of course, to be understood that snap fastener means 15, 16, 17 either of the single form illustrated in Fig. 8 or of the multiple form illustrated in Fig. 10 may be applied to the embodiment illustrated in Figs. 5, 6 and 7. Likewise, it is, of course, to be understood that the dimensions and proportions of the device will vary with the particular use for which it is adapted.

It will be clearly understood that the tool provides full insulating enclosure of the conductor ends and sleeve where they are engaged by the connector tool and also full insulating enclosure of the connector sleeve where attached thereto. This enables the worker, or linesman, to work in a free and unhindered manner because of the knowledge that he is fully protected from accidental shock or burning due to engagement of a part of his body or perspiration-dampened clothing with electrified parts of the conductor, conductor sleeve or connector tool.

In the use of the tool, the connector tool 2 is first placed in position and then clamped as shown in Fig. 1 and thereafter the device 1 is slipped over the connector tool 2, the sleeve 3 and enclosed conductor ends 4 and 5 whereby the workman may grasp the handles of the connector tool 2 through the body 1 of the connector sleeve or boot. Where the connector sleeve or boot 1 is provided with reenforcement, such as the bead 12, the resiliency of the body portion and the rigidity of the bead 12 will prevent accidental slippage of the body 1 longitudinally and thus maintain it in position. Where the body 1 is provided with snap fastening means, such as 15, 16, 17, as shown in Figs. 8 to 11, the workman may secure these snap fastener means together after placement of the body 1 in position whereby accidental displacement of the body 1 is positively prevented.

It is, of course, to be understood that the above described structure is merely illustrative of the manner in which the principles of my invention may be utilized and that I desire to comprehend within my invention such modifications as come within the scope of the claims and the invention.

Having thus fully described my invention, what I desire to claim and secure by Letters Patent is:

I claim:

1. In combination with a linesman's connector tool having conductor end portions clamped therebetween and extending transversely therefrom, a safety device comprising an elongated flexible insulating sleeve member surrounding said connector tool, said sleeve member being closed at one end and having at the other end thereof a transverse connector end portion accommodating slot providing for extension of said conductor end portions therethrough, from side to side thereof.

2. As an article of manufacture for use as a linesman's safety device for enclosing a linesman's connector tool and conductor ends clamped between the jaws thereof, an elongated sleeve member of flexible but self-sustaining insulating material for completely surrounding a linesman's connector tool, said sleeve member being closed at one end and having a transverse slot therethrough at the opposite end for accommodating conductors engaged by said connector tool.

3. As an article of manufacture for enclosing a linesman's connector tool and conductors clamped thereby and usable as a linesman's safety device, a hollow linesman's connector tool enclosing sleeve member of flexible insulating material having a transverse conductor accommodating slot at one end thereof, and snap fastener means removably securing together the end portions at opposite sides of said slot around conductors disposed in said slot.

4. A safety device for electric linesmen comprising a hollow insulating body closed at one end and adapted to enclose a connector tool clamped to an electrical conductor connector sleeve, lip portions at the end of said body opposite said closed end adapted for disposition at opposite sides of the connector sleeve, and snap fastener means for removably securing said lip portions together comprising aligned aperture means in each lip portion and a double headed member extending through apertures and having the heads thereof larger than said aperture means.

5. A safety device for electric linesmen comprising a hollow insulating body closed at one end and adapted to enclose a connector tool clamped to an electrical conductor connector sleeve, lip portions at the end of said body opposite said closed end adapted for disposition at opposite sides of the connector sleeve and having apertures therein, and plural resilient snap fastener means cooperatively engageable with said apertures for removably securing said lip portions together and preventing displacement of said insulating body.

6. A safety device for enclosing a connector tool clamped to a connector sleeve disposed transversely thereof and having conductor ends therein, said device comprising a hollow resilient connector tool enclosing rubber sleeve member, said sleeve member being closed at one end and having a slot at its opposite end adapted for extension of said connector sleeve and said conductor ends therethrough, the end portions adjacent said slot being urged together into flat engagement by the resiliency of said rubber body for engagement with said conductor ends and said connector sleeve.

7. A safety device for enclosing a connector tool clamped to a connector sleeve disposed transversely thereof and having conductor ends therein, said device comprising a hollow connector tool enclosing resilient rubber sleeve member, said sleeve member being closed at one end and having a slot at its opposite end adapted to accommodate extension of said connector sleeve and said conductor ends therethrough, the end portions adjacent said slot being urged together into flat engagement by the resiliency of said rubber body, and an integral marginal reenforcing bead on said end portions for increasing the force urging them together for close engagement with said connector sleeve and said conductor ends.

8. A safety device for enclosing a connector tool clamped to a connector sleeve having conductor ends therein, said device comprising a hollow resilient rubber sleeve member, said sleeve member being closed at one end and having a slot at its opposite end adapted for extension of said connector sleeve and said conductor ends therethrough, the end portions adjacent said slot being urged together by the resiliency of said rubber body and being provided with aligned apertures, and cooperating resilient double headed snap fastener means extending through the apertures in said end portions for removably securing them together and preventing accidental displacement of said device with respect to said connector tool, said connector sleeve and said conductor ends.

9. In a device as claimed in claim 2, means for removably securing together the end portions of said sleeve at opposite sides of said slot around conductor ends disposed in said slot.

ALBERT L. TAYLOR.